United States Patent [19]

Dwillies

[11] Patent Number: 5,277,512

[45] Date of Patent: Jan. 11, 1994

[54] JOINT FOR DETACHABLE CONNECTION OF STRUCTURAL MEMBERS

[75] Inventor: Paul K. L. Dwillies, Delta, Canada

[73] Assignee: PDL Holdings Ltd., Canada

[21] Appl. No.: 852,449

[22] Filed: Mar. 16, 1992

[51] Int. Cl.[5] ............................................. F16B 12/20
[52] U.S. Cl. ........................................ 403/348; 403/382;
403/252; 403/178; 403/406.1; 24/590; 411/500;
52/710
[58] Field of Search ................ 403/252, 253, 348, 360,
403/363, 375, 381, 365, 177–178, 405.1, 406.1,
322; 24/590, 453, 287; 411/555, 554, 508, 500;
52/710, 708, 127.11, 127.12, 127.7; 248/298;
40/82

[56] References Cited

U.S. PATENT DOCUMENTS

| | | | |
|---|---|---|---|
| 170,495 | 11/1875 | Saint | 403/119 X |
| 3,179,367 | 4/1965 | Rapata | 403/252 X |
| 3,339,954 | 9/1967 | Alvden | 403/322 |
| 3,578,374 | 5/1971 | Glassmeyer | 24/287 X |
| 3,593,387 | 7/1971 | Georgi | 410/82 |
| 3,749,438 | 7/1973 | Loomis et al. | 410/82 X |
| 3,837,128 | 9/1974 | O'Brien | 52/127.11 X |
| 4,012,155 | 3/1977 | Morris | 403/360 X |
| 4,073,113 | 2/1978 | Oudot et al. | 52/710 |
| 4,212,251 | 7/1980 | DiMartino | 24/287 |
| 4,247,216 | 1/1981 | Pansini | 403/322 X |
| 4,457,117 | 7/1984 | Leiher et al. | 52/127.12 X |
| 4,490,064 | 12/1984 | Ducharme . | |
| 4,571,902 | 2/1986 | Liebetrau | 52/127.7 X |
| 4,583,359 | 4/1986 | Staeger . | |
| 4,778,487 | 10/1988 | Chenel . | |
| 4,899,973 | 2/1990 | Ishida et al. | 248/298 |
| 4,936,066 | 6/1990 | Rütsche et al. | 403/406.1 X |
| 5,002,418 | 3/1991 | McCown et al. | 24/287 X |

FOREIGN PATENT DOCUMENTS

| | | | |
|---|---|---|---|
| 1480511 | 4/1967 | France | 403/381 |
| 2445461 | 8/1980 | France | 403/323 |
| 2516184 | 5/1983 | France | 403/405.1 |
| 7705810 | 11/1978 | Netherlands | 403/353 |
| 2171140 | 8/1986 | United Kingdom | 403/326 |

*Primary Examiner*—Randolph A. Reese
*Assistant Examiner*—Harry C. Kim
*Attorney, Agent, or Firm*—Barrigar & Oyen

[57] ABSTRACT

A simple joint is disclosed for detachably connecting structural members. The connection is made with a resilient T-shaped tongue on a first member which can be engaged in a T-shaped slot on a second member. The tongue is engaged in the slot by rotating it about its axis. Rotation of the tongue causes the end of the tongue to be drawn into the slot by wedging action between the tongue and sloped inner surfaces of the slot. The first and second members are held tightly together by tension which is developed in the tongue as the tongue is drawn into the slot. The invention is well adapted for use in many fields which require parts to be detachably connected to one another such as constructing panel display systems, building modular cabinets or shelving units and building modular furniture.

5 Claims, 9 Drawing Sheets

JOINT FOR DETACHABLE CONNECTION OF STRUCTURAL MEMBERS

FIELD OF THE INVENTION

This invention relates to a simple means for detachably connecting structural members together. The connection is made by engaging a resilient T-shaped tongue on a first member within a mating T-shaped slot on a second member. Rotation of the tongue within the slot causes a wedging action between the tongue and sloped inner surfaces of the slot which stretches the tongue and compresses the portions of the tongue which are in contact with the sloped inner surfaces of the slot. This draws the tongue firmly into the slot. Once in place the tongue remains in tension, holding the first and second members tightly together.

BACKGROUND OF THE INVENTION

There are many applications which require parts to be detachably connected with a joint which is reliable, easy to operate, and holds the parts firmly together. Some applications in which such joints are desirable are in joining the components of a panel display system, in assembling modular kitchen cabinets and in assembling shelving units. Of course, many other applications are also possible.

For the purpose of illustration the novel joint of the invention is hereinafter described in the context of a panel display system. Such systems are frequently used for temporary displays in advertising, displaying information at conferences and the like. Ideally, a panel display system should be light in weight, inexpensive, quick and easy to assemble and should allow a wide variety of configurations to be constructed with a few basic components. A necessary prerequisite to making a panel display system with these attributes is a means for securely and easily detachably connecting the various components of the system together. It can be readily appreciated that a good attachment means for connecting the components of a panel display system will have application in many fields where it is desirable to quickly and securely detachably connect members together.

A typical panel display system includes a number of rigid members which can be connected to form a structure. Typically the structure is in the form of a framework with vertical members interlinked by a number of horizontal members. Connectors, which are usually integral with the ends of the horizontal members, are provided for joining the horizontal members to the vertical members. After the framework of vertical and horizontal members is erected, panels may be inserted in the rectangular spaces bordered by the members.

The difficulty with currently available panel display systems is that they use complicated means to connect the structural members. This makes these systems either expensive or time consuming to assemble or both. Similar problems exist in other fields in which detachable joints are used for linking parts together.

Staeger, U.S. Pat. No. 4,583,359 shows a modern system for assembling a display from portable frame members. The frame members are tubes with longitudinal undercut grooves on their exterior surfaces. The end of one tube can be clamped to a point along the length of a second tube by means of a clamping element which is affixed to the end of the first tube. The clamping element is inserted into one of the longitudinal grooves on the second tube and tightened by turning a screw. Turning the screw forces apart tie bar clamps at the end of the clamping element. As they are forced apart, the tie bar clamps are drawn toward the body of the clamping element. The tie bar clamps engage the undercut surfaces of the longitudinal grooves in the second member and hold the first member perpendicular to the second member.

The clamping mechanism described by Staeger has several parts and is therefore, relatively expensive to make. Furthermore, when the Staeger system is assembled, each joint must be individually tightened with a screwdriver. This makes assembly of the system relatively time consuming.

Chenel, U.S. Pat. No. 4,778,487 describes a modular panel display system of vertical and horizontal members which can be inter-connected to form a frame work. The vertical members have longitudinal T-shaped slots and the horizontal members have T-shaped bolts projecting from their ends. A horizontal member may be attached to a vertical member by aligning the bolt on an end of the horizontal member with the opening of the slot on the vertical member, inserting the bolt into the slot, and twisting the horizontal member about its axis. As the horizontal member is twisted the ends of the bolt engage in the T-shaped slot. The bolt is locked into place in the slot by a ball and spring detent mechanism. Chenel provides a further mechanical locking mechanism to lock the horizontal member at one of a number of particular positions along the vertical member. While the Chenel panel display system appears to be quick to assemble, it is relatively complicated and, therefore, expensive to manufacture.

SUMMARY OF THE INVENTION

This invention pertains to an interlocking joint in which a tongue projecting from a first member is interlockably engaged within a groove in a second member. The groove comprises: a narrow mouth extending through an outer wall of the second member; a wide aperture extending through the second member parallel to the mouth; and, sloped surfaces connecting the inward edges of the mouth to the respective outward edges of the aperture. The tongue comprises: a narrow segment extending from the first member; and, a wide segment extending from the narrow segment.

In another aspect, this invention pertains to a member connectible with an interlocking joint. The member comprises: an aperture in a surface of the member; and, a resilient tongue with a first end affixed in the aperture and a second end projecting from the aperture. The tongue comprises: a narrow segment extending from the aperture past the surface; and, a wide segment extending from the narrow segment.

In a third aspect, this invention pertains to a member connectable with an interlocking joint. The member comprises a groove on a face of the member. The groove comprises: a narrow mouth extending through an outer wall of the member; a wide aperture extending through the member parallel to the mouth; and, sloped surfaces connecting the inward edges of the mouth to the respective outward edges of the aperture.

BRIEF DESCRIPTION OF THE DRAWINGS

In drawings which illustrate embodiments of the invention.

DETAILED DESCRIPTION OF THE PREFERRED EMBODIMENT

Figure 1:
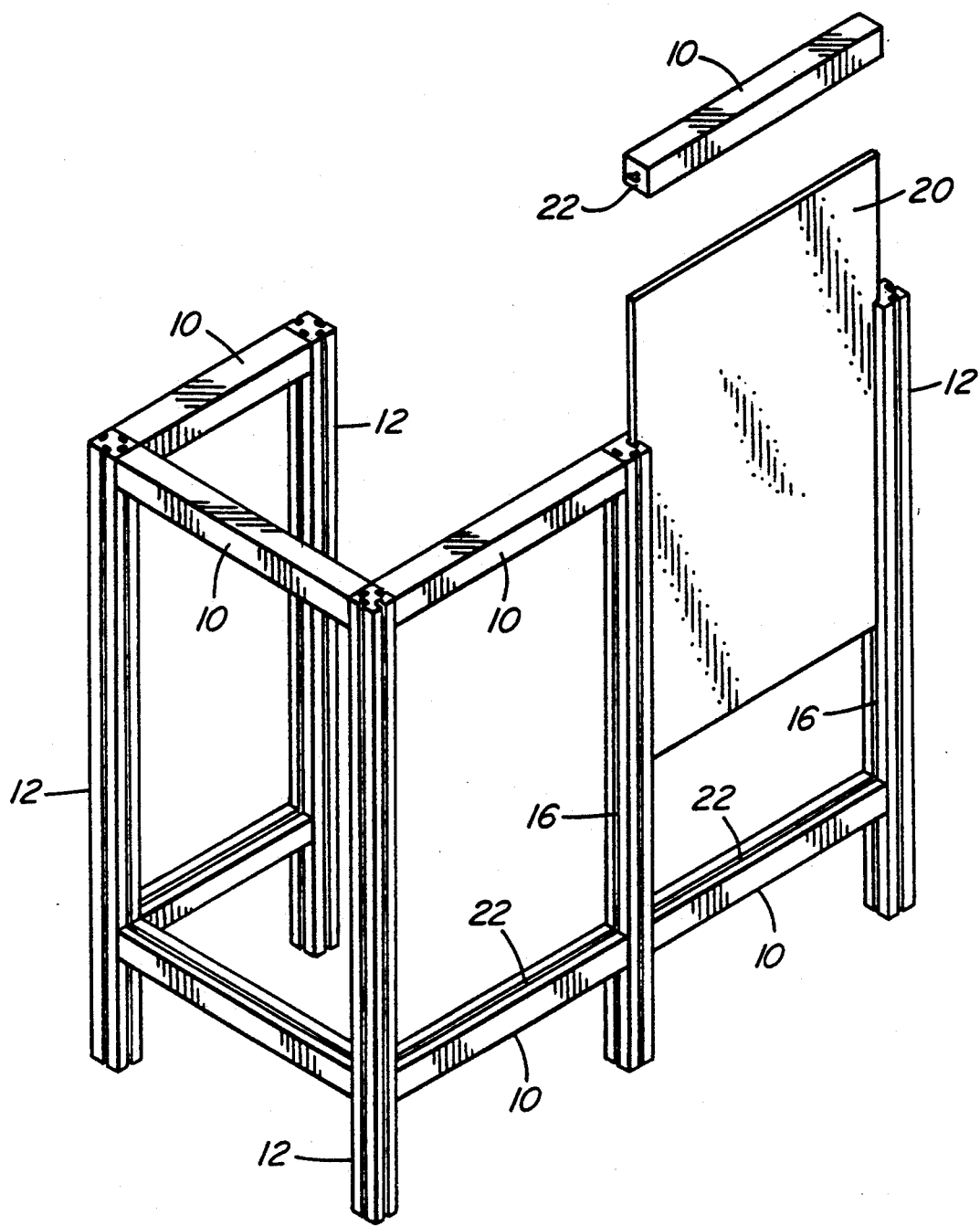
FIG. 1 is a perspective view of a framework of members in a display system.

FIG. 1 shows a temporary display stand comprising a framework of horizontal members 10 and vertical members 12. Panels 20 are fitted into some of the rectangular openings in the framework. Panels 20 are slightly wider than the distance between vertical members 12 so that the edges of panels 20 fit inside slots 16 in vertical members 12. Panels 20 are thereby held within the framework. Horizontal members 10 may also have longitudinal slots 22 to receive the upper and lower edges of panels 20 so that panels 20 are firmly retained in, and stabilize the framework.

Figure 2:
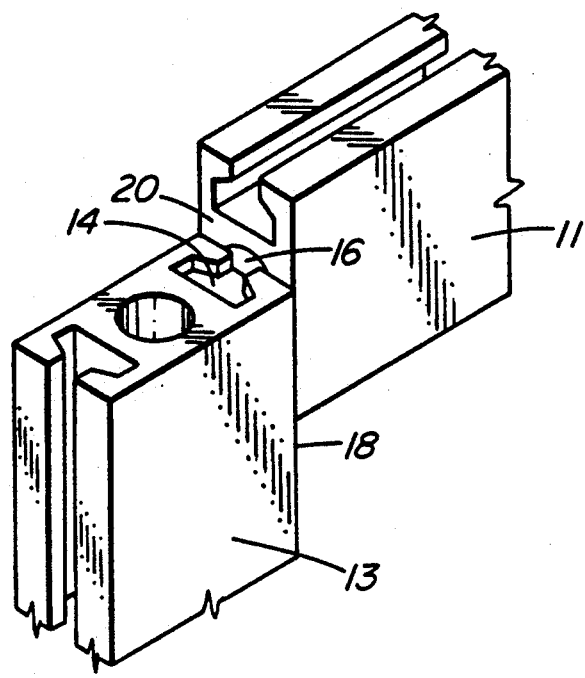
FIG. 2 is a partially cut away perspective view of a horizontal member connected to a vertical member.

FIG. 2 shows the connection of one horizontal member 11 to one vertical member 13 in accordance with the present invention. Horizontal member 11 has a projecting tongue 14 which is lockably engaged with a longitudinal slot 16 provided in face 18 of vertical member 13. The upper portion of vertical member 13 has been cut away to better show the engagement of tongue 14 in slot 16. Horizontal member 11 is held firmly in place at right angles to vertical member 13 by frictional engagement between the end 20 of horizontal member 11 and the face 18 of vertical member 13 and between tongue 14 and the inside surfaces of slot 16.

Figure 3:
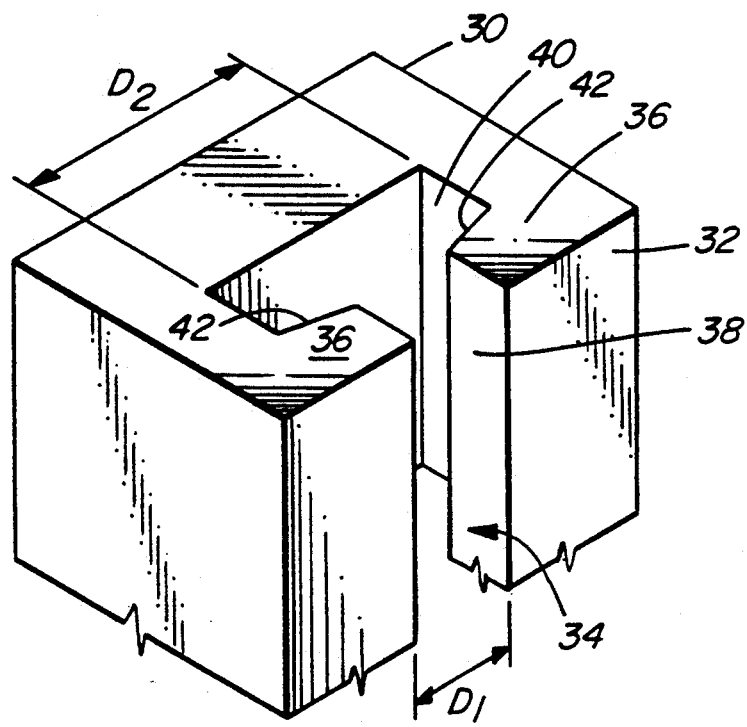
FIG. 3 is a perspective view of a section of a vertical member similar to the vertical member shown in FIG. 2 but having only one channel.

FIG. 3 is a detailed perspective view of a section of a slotted member 30 according to the invention. Member 30 may be made of wood, plastic, lightweight metal or any other material which combines the desirable qualities of light weight, durability, attractive looks and reasonable cost.

Member 30 has a face 32 and a slot 34 extending longitudinally along face 32. The sides of slot 34 are undercut to form ridges 36 on either side of slot 34 which define a narrower mouth 38 and a wider inner area 40. Mouth 38 has a width $D_1$. Inner area 40 has width $D_2$. Face 32, which forms the outside surface of ridges 36, is planar so that no unattractive gaps are left when the flat end of another member is butted against face 32. Sloped surfaces 42 are formed on the inside of ridges 36. Sloped surfaces 42 are inclined toward mouth 38 at an angle between about 4° and 15°.

The preferred angle of inclination of sloped surfaces 42 towards mouth 38 depends upon the material from which slotted member 30 and the tongue which is to be engaged in slot 34 are made. If the tongue is made of nylon then the preferred angular ranges are between about: 4° and 6° if member 30 is made of wood; 6° and 10° if member 30 is made of plastic; and 10° and 14° if member 30 is made of metal. Where member 30 is made of wood and the tongue to be engaged in slot 34 is made of a material harder than wood, surfaces 42 may become scored by the action of engaging the tongue in slot 34 if the angle of inclination of sloped surfaces 42 toward mouth 38 exceeds about 6°. When sloped surfaces 42 are inclined toward mouth 38 at an angle of less than about 4° and when a tongue is engaged in slot 34 (as described with reference to FIG. 6 below) the tongue may not be drawn into slot 34 far enough to make the joint tight. Consequently, the joint may be looser than it would be if sloped surfaces 42 were inclined at a higher angle toward mouth 38. Where sloped surfaces 42 are inclined toward mouth 38 at an angle greater than about 15° and when a tongue is engaged in slot 34 (as described with reference to FIG. 6 below) the tongue may be subjected to so much force as it is drawn into slot 34 that the tongue may break.

With the sloped surfaces, 42, on their inner surfaces, ridges 36 taper from a thicker area in their portions away from mouth 38, to a thinner area in their portions adjacent to mouth 38.

Figure 4:
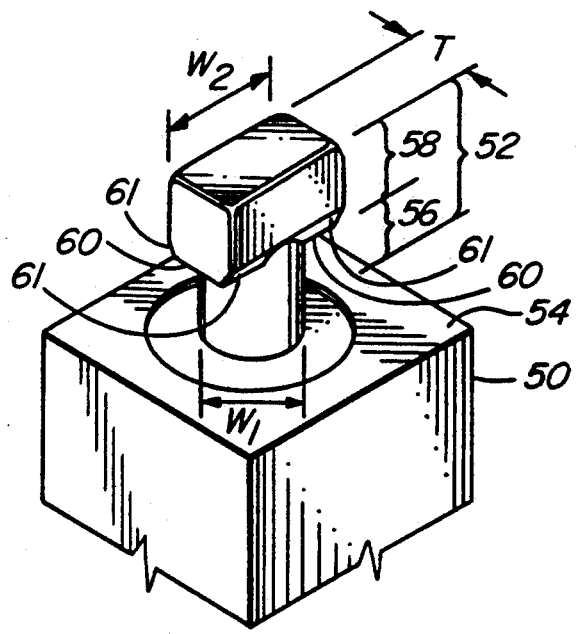
FIG. 4 is a perspective view of the end of a horizontal member similar to the horizontal member shown in FIG. 2 but not having any channels.

FIG. 4 shows a member 50 capable of lockable engagement with the slotted member shown in FIG. 3 by means of a tongue 52 which is designed to engage within slot 34. Tongue 52 projects from the end surface 54 of member 50. The thickness of tongue 52 which is represented by the dimension T is less than $D_1$, the width of mouth 38, so that tongue 52 can be inserted into slot 34. Tongue 52 comprises a narrow cylindrical segment 56 extending from member 50 having a diameter, $W_1$, which is less than the width $D_1$ of mouth 38; and, wide segment 58 having a width $W_2$, which is greater than the width $D_1$ of mouth 38. Wide segment 58 extends from narrow segment 56. Narrow segment 56 and wide segment 58 both have the same thickness T. Width $W_2$ is less than the width $D_2$ of inner area 40 of slot 34. The narrow segment 56 of tongue 52 is separated from wide segment 58 of tongue 52 by shoulders 60.

Shoulders 60 extend generally perpendicularly to narrow segment 56. The front and rear edges 61 of shoulders 60 are bevelled at an angle of approximately 45° to the faces of shoulders 60.

Figure 5:
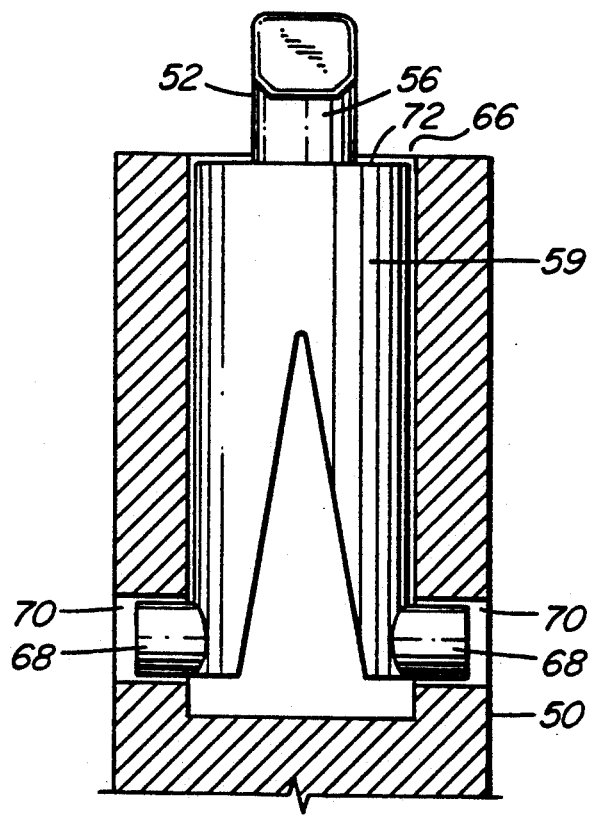
FIG. 5 is a longitudinal section through the end of the member shown in FIG. 4.

FIG. 5 shows a longitudinal cross section through the end of member 50. Tongue 52 is an extension of body 59 which lies within aperture 66 provided in end 54 of member 50.

Body 59 is retained in aperture 66 by transversely extending pins 68 which snap into cross-drilled apertures 70 when body 59 is slidably inserted through aperture 66. Body 59 may be removed by pushing pins 68 inwardly (i.e. toward one another) with suitable tools inserted through apertures 70. Body 59 may require replacement if it is broken or worn or for any other reason. If this happens, body 59 can be easily replaced by removing the old body 59 as described above, squeezing the pins 68 on a replacement body 59 together, placing the end of replacement body 59 into aperture 66 and pushing replacement body 59 into aperture 66 until pins 68 snap into cross-drilled apertures 70.

Figures 6A, 6B:
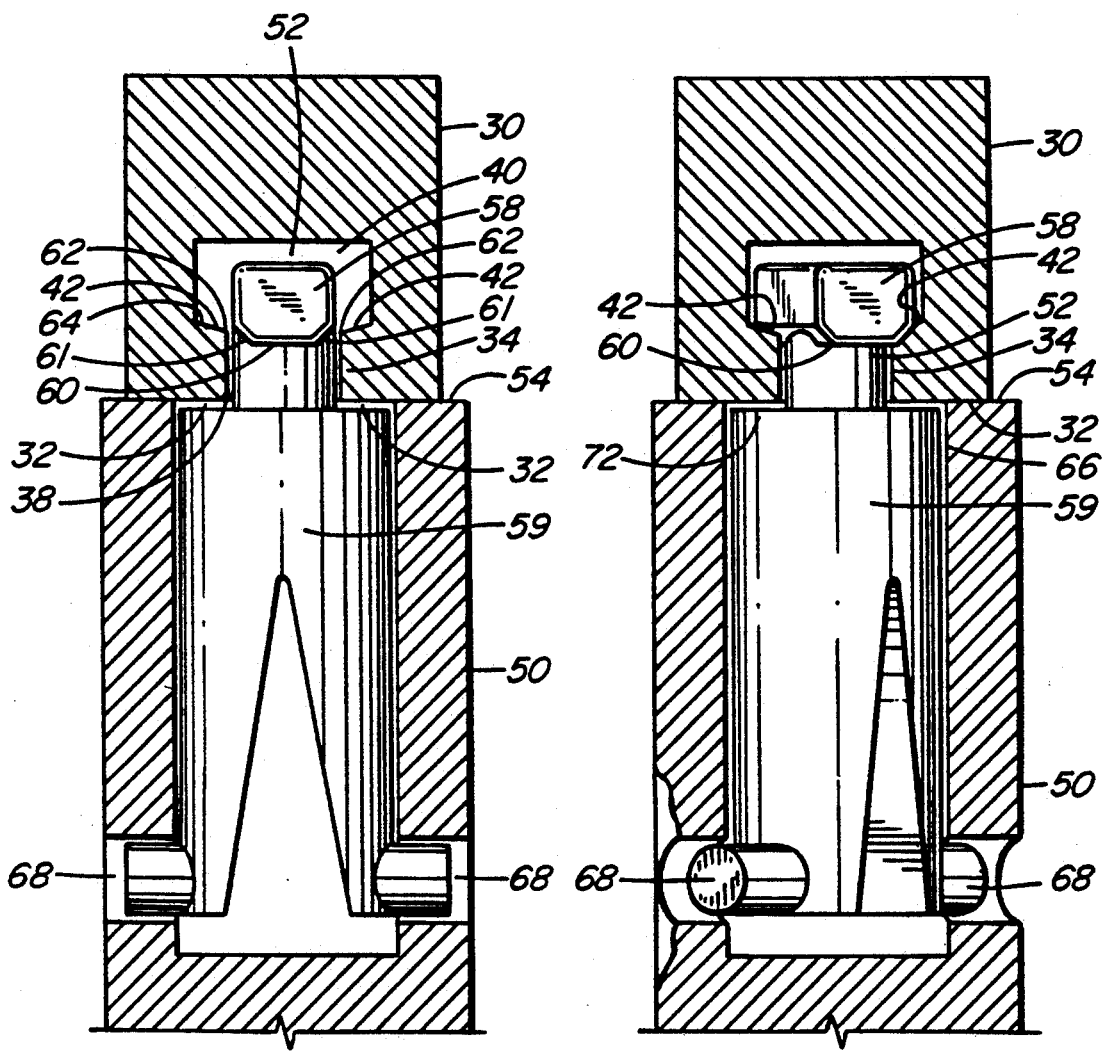
FIGS. 6(a), (b) and (c) are cut away views depicting the sequence of steps in which a tongue is engaged in a slot.

Body 59 has a flat upper surface 72 which, in its equilibrium position, lies below end surface 54 of member 50. Body 59, is preferably made from a single piece of a durable resilient material such as nylon. Suitable resilient properties are obtained where body 59 is made of a general purpose type 6 nylon available under the trademark ULTRAMID B306 NYLON 6 POLYMER which may be obtained from BASF Canada Inc. Body 59 preferably measures approximately 26 millimeters from pins 68 to upper surface 72. Narrow segment 56 is 6.5 millimeters in diameter FIG. 6(a) shows a cross-section of tongue 52 inserted in but not engaged with slot 34. Wide segment 58 of tongue 52 projects into the wider inner area 40 of slot 34. The end surface 54 of member 50 is in contact with face 32 of member 30 on both sides of mouth 38. Shoulders 60 of tongue 52 lie inside slot 34. The tops of the bevelled edges 61 of shoulders 60 extend past outer edges 62 of sloped surfaces 42. Tongue 52 is engaged in slot 34 by rotating member 50 90° about its longitudinal axis. Tongue 52 rotates along with member 50. As this happens, bevelled edges 61 of shoulders 60 come into contact with the inner edges 62 of mouth 38. Continued rotation of tongue 52 causes bevelled edges 62 to ride up onto the inside of ridges 36 bringing portions of shoulders 60 into contact with sloped surfaces 42.

FIG. 6(b) shows tongue 52 partially engaged in slot 34. As depicted in FIG. 6(b), member 50 has been rotated by approximately 35° in comparison to the position shown in FIG. 6(a). Shoulders 60 on tongue 52 are in contact with sloped surfaces 42 inside slot 34, and have ridden up sloped surfaces 42 inside slot 34.

Pins 68 prevent body 59 from rotating relative to member 50 as tongue 52 is twisted into place in slot 34. Pins 68 also retain the lower end of body 59 in aperture 66 as shoulders 60 ride up on surfaces 42. Other ways of retaining body 59 in aperture 66 such as gluing body 59 in place or moulding body 59 as an integral part of member 50 may also be used and come within the scope of the invention.

The resilient construction of body 59 allows it to bear a tension load as continued rotation of body 59 causes shoulders 60 to ride further up surfaces 42 by means of a wedging action between shoulders 60 and surfaces 42. The force exerted by surfaces 42 on shoulders 60 also causes compression of the portions of wide segment 58 underlying shoulders 60 and, if surfaces 42 are resilient, causes compression of the portions of surfaces 42 in contact with shoulders 60. In FIG. 6(b), the force exerted on shoulders 60 by sloped surfaces 42 has caused body 59 to move up toward slot 34, thus taking up any slack between pins 68 and holes 70 and between member 50 and member 30. Continued rotation of tongue 52 relative to slot 34, has caused shoulders 60 to be drawn further into slot 34. This has placed body 59 in tension between pins 58 and shoulders 60 and has caused compressive forces between surfaces 42 and shoulders 60. The combined effect of the tension stretching of body 59 and the motion of body 59 as slack is taken up between the various parts of the joint has drawn upper surface 72 upwardly away from its equilibrium position and toward face 32 of member 30.

While body 59 is preferably resilient so that it can stretch as shoulders 60 ride up sloped surfaces 42, it can readily be seen that a construction in which tongue 52 is inextensible and rigidly attached to member 50 would work in a similar way and would come within the scope of the present invention if a resilient pad were included between end surface 54 of member 50 and face 32 of member 30; or, between shoulders 60 and sloped surfaces 42.

Figure 6C:
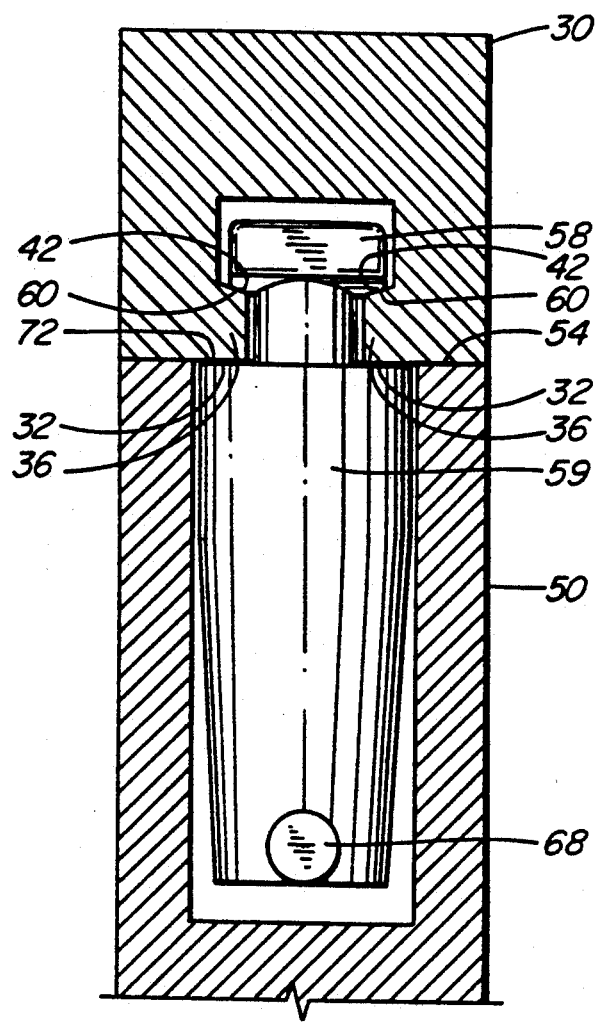

FIG. 6(c) shows tongue 52 fully engaged in slot 34. Member 50 has been rotated about its axis by 90°. Wide segment 58 of tongue 52 has been pulled completely into slot 34 by the wedging action of shoulders 60 riding up sloped surfaces 42. Body 59 has been stretched further to the point that upper surface 72 is in contact with (i.e. butted against) face 32 of member 30. The tension in body 59 between pins 68 and shoulders 60 holds member 50 against member 30. Member 50 is held in place with respect to member 30 by frictional forces between the end surface 54 of member 50 and face 32 of member 30, between the shoulders 60 and the sloped surfaces 42 and between upper surface 72 and face 32 of member 30. Ridges 36 are pinched between shoulders 60 and upper surface 72.

The foregoing discussion explains the basic inventive concept of the present invention. The following discussion describes a variety of parts which embody this inventive concept.

Figure 7:
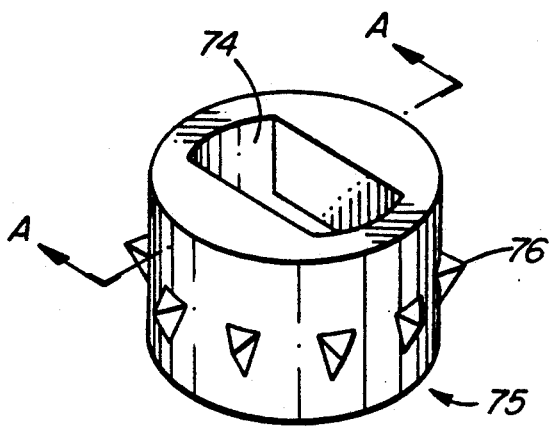
FIG. 7 is a perspective view of an insert for receiving a tongue like the tongue shown in FIGS. 4 and 5.

It may be necessary to anchor one end of a member to a point on a surface where, for some reason, it is difficult or undesirable to cut a slot. FIG. 7 shows an insert 75 capable of lockable engagement with tongue 52. Insert 75, which is preferably made of metal but may also be made of strong plastic or another suitable material, may be installed in a hole of the same diameter as insert 75 drilled at the desired position on the surface without any need for providing a full length slot on the surface. The exterior of insert 75 is provided with sharp points 76. Insert 75 is installed by forcing it into the hole drilled in the surface. As the insert is pushed into the hole, points 76 cut longitudinal grooves in the wall of the hole. After insert 75 is fully inserted into the hole, the installation is completed by rotating insert 75 through approximately 45°. During this rotation, points 76 cut circumferential grooves in the walls of the hole. Insert 75 is secured in the hole by the points 76 which sit within the circumferential grooves. Points 76 have a profile which resists extraction of insert 75 from the hole. Insert 75 has a mouth 74 in its upper surface which is sized and shaped to accept tongue 52 in the same manner described above in relation to FIGS. 6(a), (b) and (c).

Figure 8:
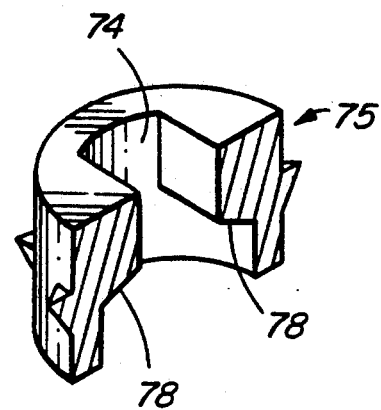
FIG. 8 is a perspective view of the insert shown in FIG. 7 cut away along line A—A.

FIG. 8 is a section taken along line A—A of insert 75 shown in FIG. 7. The internal profile of insert 75 is similar to the internal profile of slot 34 shown in FIG. 3. Sloped surfaces 78 lie on either side of mouth 74 and are inclined toward mouth 74. Tongue 52 may be engaged within insert 75 in a manner analogous to the engagement of tongue 52 in slot 34 as described above with reference to FIGS. 6 (a), (b) and (c).

Figure 9:
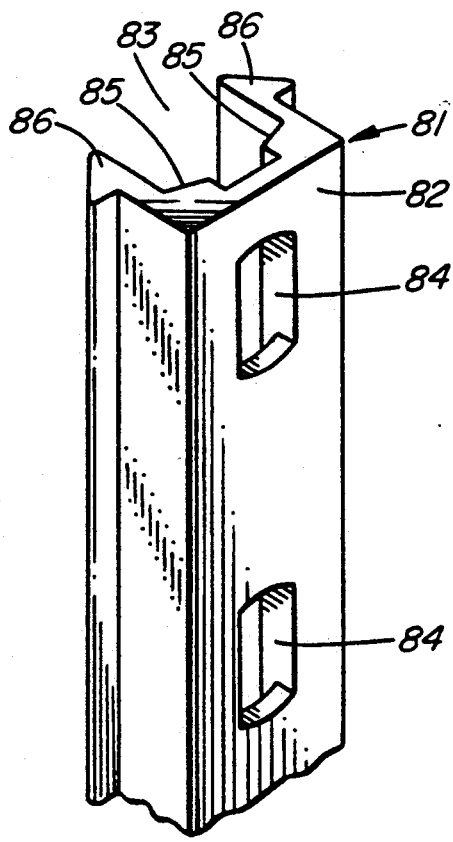
FIG. 9 is a perspective view of a member with a number of slots for receiving tongues, like the tongues shown in FIGS. 4 and 5, at discrete positions.
Figure 10:
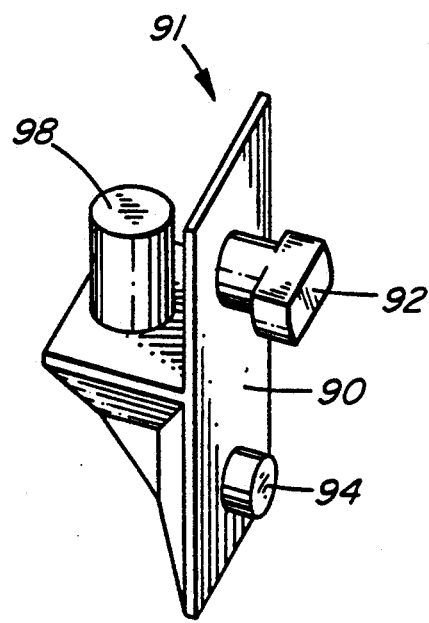
FIG. 10 is a perspective view of a shelf bracket for use in association with the member shown in FIG. 9.

FIG. 9 shows a unit 81, which is designed to support shelf bracket 91 which is shown in FIG. 10. Unit 81 has a surface 82 having a series of discrete slots 84. Each slot is capable of receiving a tongue 92. The rear surface 83 of unit 81 adjacent to slots 84 is shaped to provide sloped surfaces 85 on either side of each of slots 84. Tongue 92 engages in one of slots 84 in the same manner as described above in relation to FIGS. 6(a), (b) and (c). Unit 81 can be attached to a member (not shown) by means of tabs 86, which snap into a correspondingly profiled groove in the member.

FIG. 10 shows a shelf bracket 91 which is designed to attach to unit 81 shown in FIG. 9. A tongue 92 and a pin 94 protrude from the base 90 of bracket 91. Tongue 92 and pin 94 are spaced apart a distance equal to the distance between adjacent slots on unit 81. Base 90 is flexible to allow pin 94 to be pulled away from surface 82 while tongue 92 is rotated into engagement in one of slots 84. When tongue 92 is engaged in a slot 84, pin 94 is aligned with the adjacent slot 84. Base 90 is then released, allowing it to flex toward surface 82 to hold pin 94 in the adjacent slot. This prevents mounting bracket 91 from rotating relative to unit 81, thereby locking mounting bracket 91 in place. The side of base 90 away from tongue 92 is equipped with a shelf mounting means such as peg 98 for supporting a shelving unit. Peg 98 may be replaced with a hook or other fixture as desired.

Figure 11:
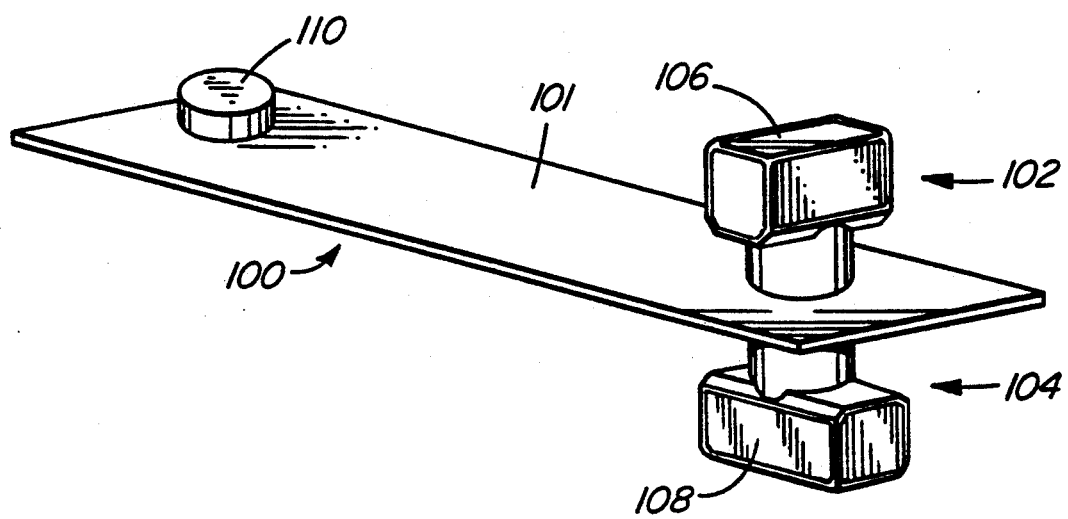
FIG. 11 is a perspective view of a unit for joining two slotted members at right angles at a point away from the ends of the members.

FIG. 11 is a perspective view of a unit 100 for joining two slotted members at right angles at points away from their ends. The ability to join members in this manner allows for more flexibility in the design of frameworks of members using the present invention. Unit 100 comprises a rectangular base 101 having tongues 102, 104 on opposite faces. The wide segment 106 of tongue 102 is aligned transversely on base 101 for engagement in the slot of a first member (not shown) extending parallel to the long axis of base 101. Wide segment 108 of second tongue 104 is aligned with the long axis of the base, perpendicular to wide segment 106 of tongue 102, for engagement in the slot of a second member (not shown) perpendicular to the first member. A pin, 110 is provided to prevent base 101 from rotating with respect to the first member. Unit 100 is installed by inserting first tongue 102 in a slot 34 in a first member and flexing base 101 to allow pin 110 to clear the first member while first tongue 102 is rotated 90° into engagement within slot 34. Base 101 is then released to allow pin 110 to fall into slot 34. Second tongue 104 is then inserted into slot 34 in the second member and the second member is rotated 90° with respect to the first member to engage second tongue 104 within slot 34 in the second member.

If, it is awkward or impossible to install unit 100 as described above because the second member cannot be rotated relative to the first member, or because it is impractical to rotate the second member relative to the first member, then unit 100 may be installed while the first and second members are maintained perpendicular to each other. This is done by inserting tongue 102 into slot 34 in the first member, inserting tongue 104 into slot 34 on the second member, and rotating unit 100 through 90° relative to the first and second members about tongues 102, 104. As unit 100 rotates, tongues 102, 104 are simultaneously engaged in slots 34 on the first and second members respectively. As unit 100 is rotated to engage tongues 102, 104 within slots 34, base 101 is flexed away from the first member to allow pin 110 to clear the first member. After the rotation has been completed, base 101 is released to allow pin 110 to fall into slot 34 on the first member.

Figure 12:
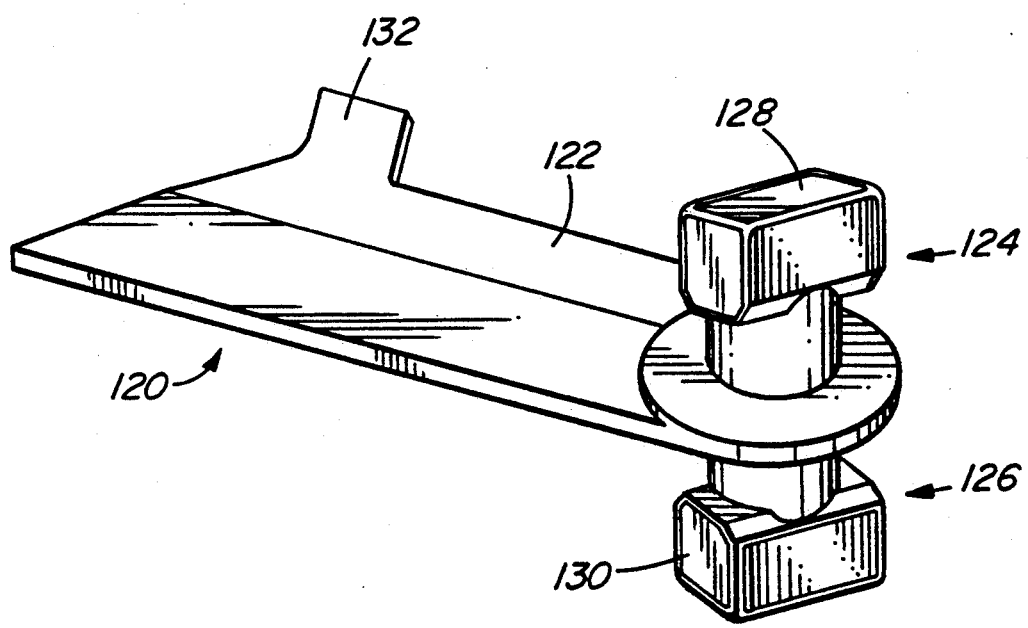
FIG. 12 is a perspective view of a unit for joining parallel slotted members at a point away from the ends of the members.

FIG. 12 is a perspective view of a unit 120 for joining two slotted parts (not shown) with the slots extending parallel to one another. Unit 120 comprises a thin flat generally rectangular base 122 which is longer than it is wide. Tongues 124, 126 project from the same point on opposite sides of base 122 near one end of base 122. Wide segments 128, 130 of tongues 124, 126 are parallel to each other, and are perpendicular to the longer axis of base 122. A fin 132 projects from the side of base 122 at its end away from tongues 124, 126.

Unit 120 is used by placing first tongue 124 into a first slot in a first slotted member (not shown) and placing second tongue 126 into a second slot in a second slotted member (not shown). At this point, the first and second slots are parallel and the end of base 122 carrying fin 132 projects perpendicular to the first and second slots. The connection is made secure by rotating base 122 about tongues 124, 126 until tongues 124, 126 are fully engaged in their respective slots (i.e. until the wide segments 128, 130 of tongues 124, 126 are perpendicular to the first and second slots respectively). At this point, base 122 will lie entirely between the first and second members with only fin 132 projecting from between the first and second members. The connection may be unmade by grasping fin 132 and rotating base 122 about tongues 124, 126 until the wide segments 128, 130 of tongues 124, 126 are parallel to the first and second slots respectively.

Figure 13:
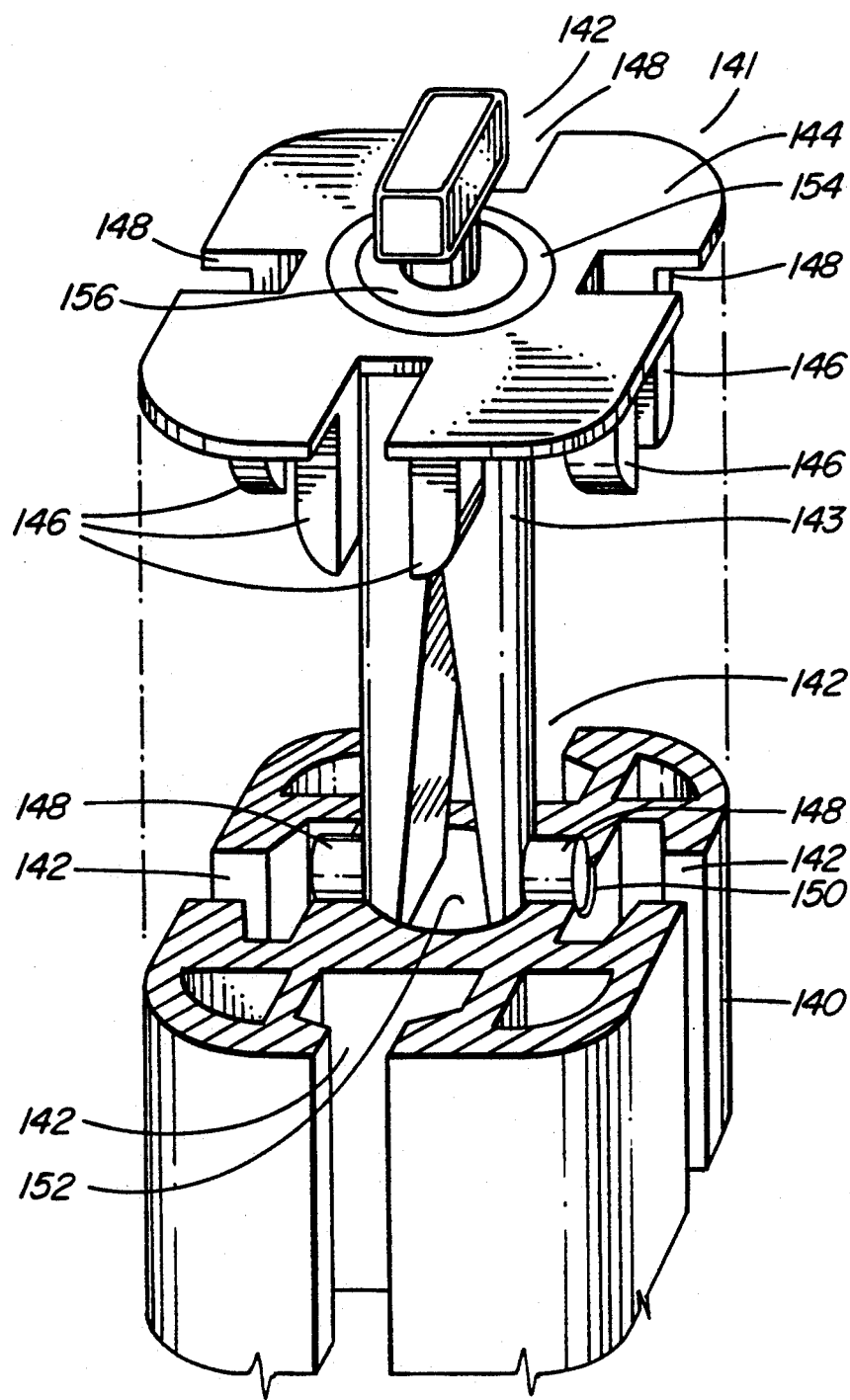
FIG. 13 is a partially cut away perspective view of th of an alternative embodiment of a horizontal member.
Figure 14A:
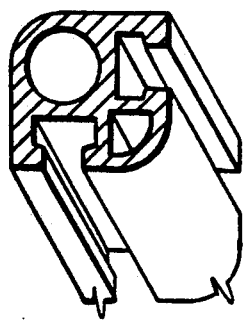
FIG. 14 (a), (b), (c), (d) and (e) show transverse sect through several alternative configurations for members capable of lockable engagement with tongues like those depicted in FIGS. 4 and 5.
Figure 14B:
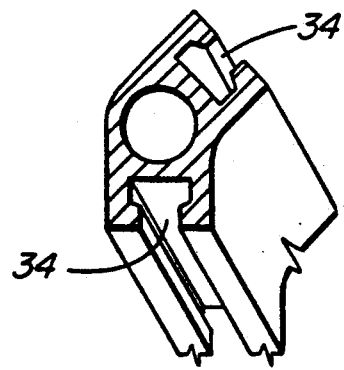
Figure 14C:
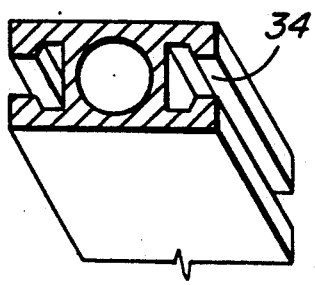
Figure 14D:
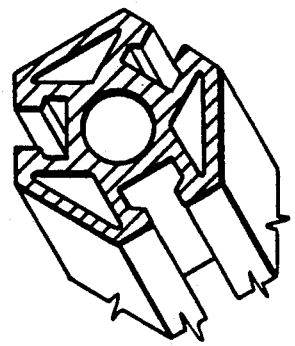
Figure 14E:
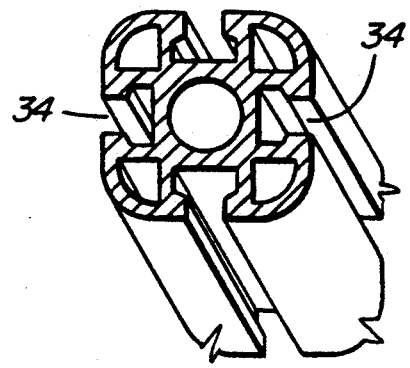

FIG. 13 is a partially cut away view of an alternative embodiment 140 of the member shown in FIG. 4. Member 140 is substantially hollow and is formed of light weight metal. The end of member 140 is capped by a part 141 comprising a tongue 142, a body 143 and a shield 144. Tongue 142 is an extension of body 143 and is engageable in slots such as slot 34 shown in FIG. 3. The end of member 140 is covered by integral shield 144. Shield 144 prevents dirt from entering the internal passages of member 140, gives the end of member 140 a neat appearance and provides a smooth bearing surface on the end of member 140. Plates 146 extending from shield 144 bear on the inside surfaces of slots 142 in member 140 to maintain the alignment of shield 144 relative to the end of member 140.

Shield 144 has notches 148 which align with slots 142 in member 140. Notches 148 prevent shield 144 from interfering with the installation of panels 20 (as described above in the discussion of FIG. 1) when member 140 is used in a panel display system. Body 143 is retained in member 140 by pins 148 which snap into holes 150 in central channel 152 of member 140. Body 143 is connected to shield 144 by flexible diaphragm 154 which attaches to body 143 at shoulder 156. Tongue 142 extends from the centre of shoulder 156. Diaphragm 154 allows shoulder 156 to move as tongue 142 is drawn into the slot in a slotted member as described above with reference to FIG. 6.

FIGS. 14 (a) through (e) are transverse cross sections through various members having slots 34 for receiving tongues 52 of members such as the member shown in FIG. 3. The various members shown in FIG. 14 may be used to construct frameworks with different symmetries. FIGS. 14(a), (b), and (c) are transverse cross sections through members having two slots for making structures with corners of 90°, 135 and 180° respectively. FIG. 14(d) is a transverse cross section through a member having three slots for joining three walls of a structure at 120 degree separation. FIG. 14(e) is a transverse cross section through a member having four slots for joining four walls of a structure at 90 degree separation.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An interlocking joint in which a tongue projecting along an axis from a face of a first member is interlockably engaged within a groove in a second member, said groove comprising:
   (a) a narrow mouth extending through an outer wall of said second member;
   (b) a wide aperture extending through said second member parallel to said mouth;
   (c) sloped surfaces connecting inward edges of said mouth to respective outward edges of said aperture;
and said tongue comprising:
   (d) a narrow segment extending from said first member;
   (e) a wide segment extending from said narrow segment, said wide segment having a pair of inward edges projecting laterally on two sides of said narrow segment to constitute a pair of opposed shoulders facing said face of said first member;
wherein said sloped surfaces act as ramps to draw said shoulders into said groove away from said face of said first member and to thereby tension said narrow segment when said tongue is rotated about said axis between a disengaged position in which said wise segment is substantially inside of and parallel to said mouth and an engaged position in which said wide segment is generally perpendicular to said mouth.

2. The interlocking joint of claim 1 wherein said tongue is resilient.

3. The interlocking joint of claim 1 or 2 wherein said sloped surfaces are inclined toward said mouth at an angle in the range of 4° to 15° with respect to said axis.

4. A tongued member for forming an interlocking joint, said member comprising:
   (a) an aperture in a surface of said member;
   (b) a resilient tongue with a first end affixed in said aperture and a second end projecting from said aperture;
   (c) a shield covering said surface of said member;
   (d) a shield aperture in said shield around said tongue;
said tongue comprising:
   (e) a body affixed within said aperture, said body having an outer surface;
   (f) a narrow segment extending along an axis from said outer surface of said body past said surface of said member; and
   (e) a wide segment extending from said narrow segment, said wide segment having a pair of inward edges projecting laterally on two sides of said narrow segment to constitute a pair of opposed shoulders facing said face of said member;
   (f) a flexible diaphragm joining said outer surface of said body to the edge of said shield aperture;
wherein said shoulders are elastically displaceable away from said surface of said member by forcing said shoulders outwardly along said axis; and, wherein application of said force to said.

5. An attachment lockably engageable with a member, said member comprising a groove on a face of said member, said groove comprising a narrow mouth extending through an outer wall of said member, a wide aperture extending through said member, parallel to said mouth and, sloped surfaces connecting inward edges of said mouth to respective outward edges of said aperture, said attachment comprising:
   (a) a thin flexible base having first and second sides;
   (b) a pin projecting from said first side of said base;
   (c) a first tongue on said first side of said base adjacent to said pin;
said first tongue comprising:
   (d) a first narrow segment projecting from said base; and,
   (e) a first wide segment projecting from said narrow segment;
said first wide segment oriented perpendicular to an axis extending between said pin and said first tongue;
   (f) a second tongue on said second side of said base, said second tongue comprising:
   (g) a second narrow segment coaxial with said first narrow segment projecting from said base; and,
   (h) a second wide segment projecting from said second narrow segment;
said second wide segment oriented perpendicular to said first wide segment.

* * * * *